Patented Feb. 22, 1927.

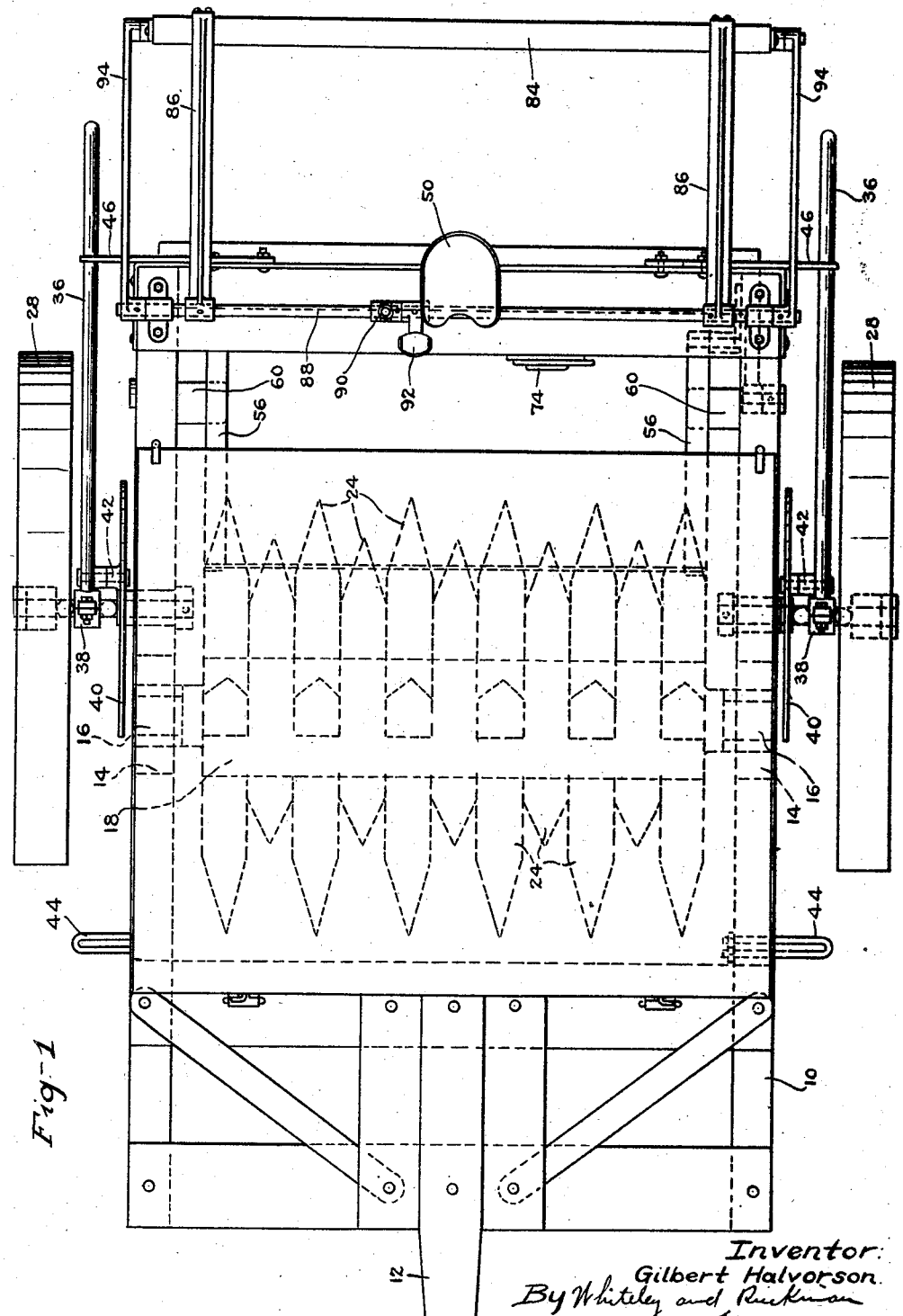

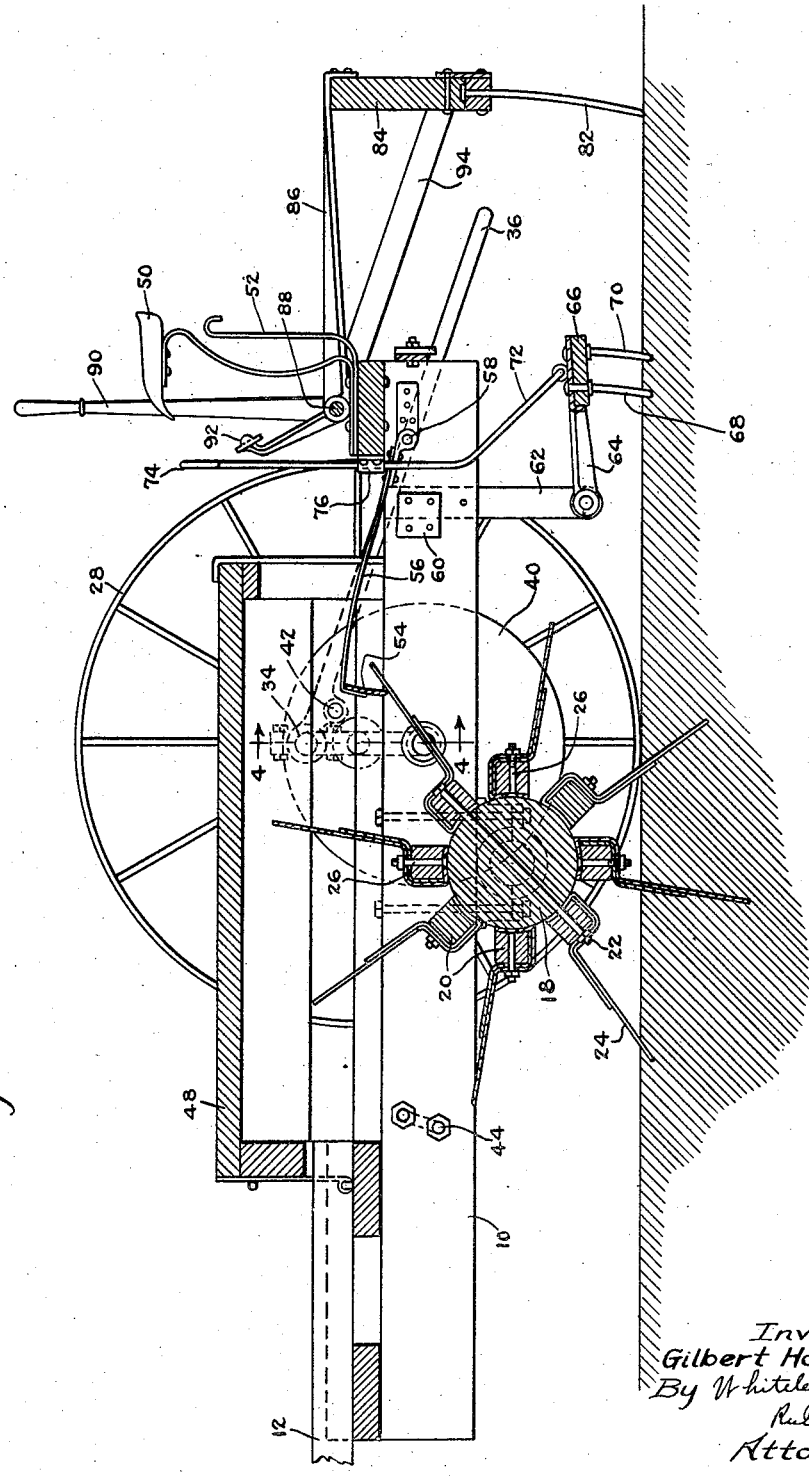

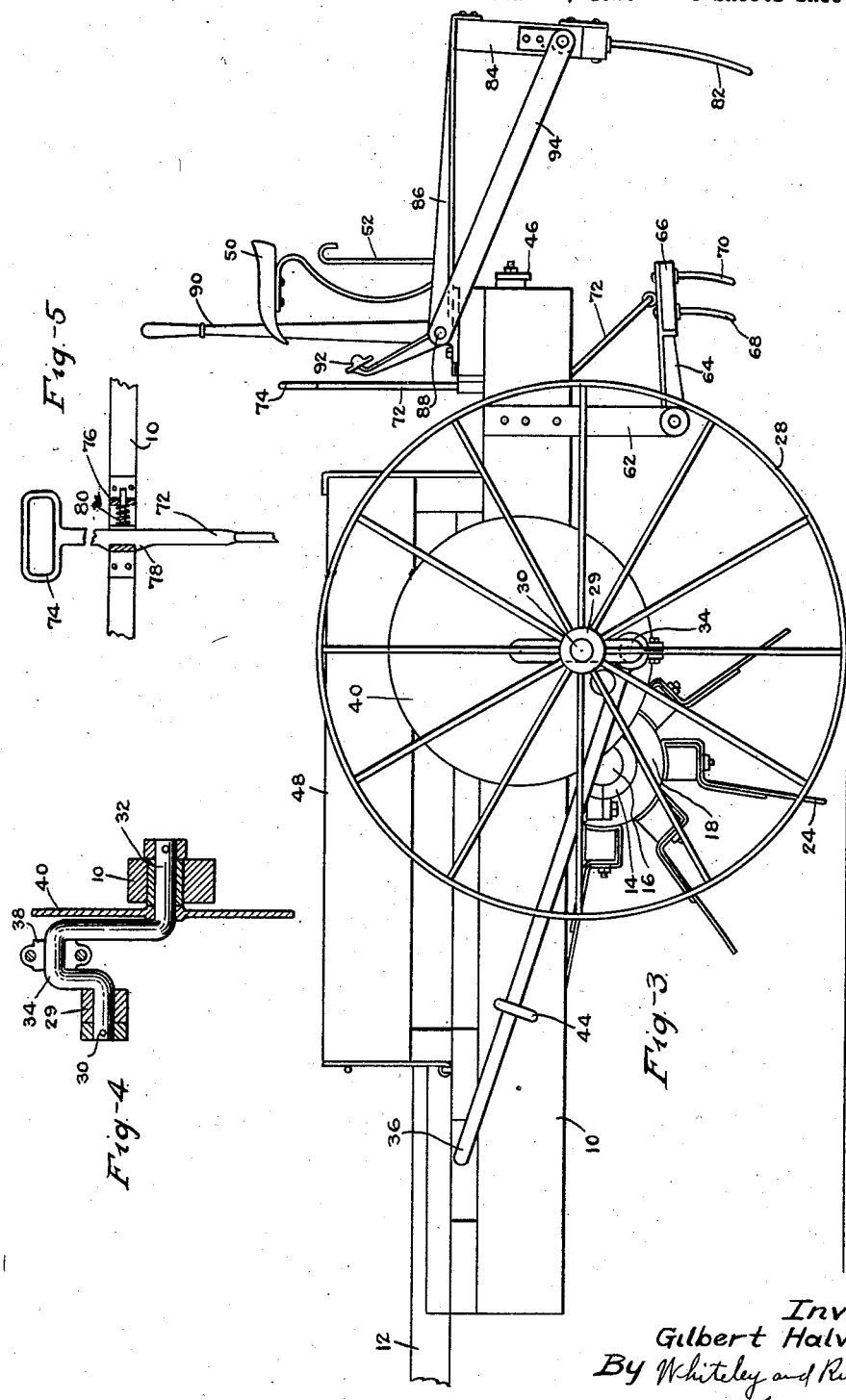

1,618,656

UNITED STATES PATENT OFFICE.

GILBERT HALVORSON, OF NORTHWOOD, NORTH DAKOTA.

MACHINE FOR PULLING AND RAKING THISTLES.

Application filed March 19, 1926. Serial No. 95,893.

My invention relates to machines for pulling and raking thistles. An object is to provide a machine which will pull thistles out of the ground and rake them into rows where they will dry. The machine is intended more particularly for use in connection with what are commonly known as "sow thistles". Another object is to provide a machine of this character having in addition to the main rake, an auxiliary rake which serves to level the ground after the thistles have been pulled. Another object is to provide a machine of this character in which diggers or teeth are carried by a rotatable member which can be lifted to bring the digging teeth above the ground so that the machine can be transported on the highway or over fields which are not to be operated upon.

The full objects and advantages of my invention will appear in connection with the detailed description thereof, and the novel features of my inventive idea will be particularly pointed out in the claim.

In the accompanying drawings which illustrate a practical embodiment of my invention—

Fig. 1 is a top plan view of the machine. Fig. 2 is a view in vertical longitudinal section. Fig. 3 is a side elevational view. Fig. 4 is a detail view in section on the line 4—4 of Fig. 2. Fig. 5 is a detail view of an operating device for the auxiliary rake.

Referring to the construction shown in the drawings, the numeral 10 designates the frame of the machine to which at the front end a draft bar 12 is secured whereby the machine may be drawn either by horses or by a tractor. Secured to the underside of the frame at opposite sides thereof, are bearings 14 in which rotate trunnions 16 projecting from the ends of a cylindrical member 18 to which are secured a number of bars 20 extending lengthwise of the cylinder in spaced relation around its periphery. The bars may be secured in any suitable manner and, as shown, are secured by bolts 22 passing through the axis of the cylinder and through two diametrically opposite bars. A plurality of digging teeth 24 are secured to the bars 20, the teeth on any bar being in staggered relation to the teeth of the adjacent bar as will be understood from Fig. 1. These teeth are of springy material and as shown consist of two parts of different length, one overlying the other so that the shorter one constitutes a back support for the longer one. The outer ends of the diggers are pointed, and the inner ends are bent so as to extend around the inner and outer surfaces of bars 20 in order that the diggers may be securely attached by bolts 26. The frame of the machine is mounted on a pair of wheels 28 having hubs 29 and these wheels are attached to the frame in such manner that the latter may be lifted to bring the teeth above the ground for transporting the machine. For this purpose, crank members shown in Fig. 4 are provided. The crank members have opposite end portions 30 and 32 and an intermediate crank portion 34, the portion 32 being farther than the portion 30 from the crank portion 34. The hubs 29 of the wheels are rotatably mounted on the portions 30 while the portions 32 are oscillatingly mounted in the frame 10. Handles 36 are attached at their inner ends to the crank portions 34 by straps 38 and near their end just referred to are attached to disks 40 by means of bolts or rivets 42, these disks being centrally mounted on the horizontal portions 32. When the handles 36 are placed in the position shown in Fig. 3, the frame carrying the teeth 24 therewith will be lifted from the ground. When the handles are turned backward into the position shown in Figs. 1 and 2, the frame and teeth will be lowered so that the latter are in position to dig into the ground. The handles are adapted to be held in forward position in suitable manner as by U-bolts 44 which may be readily released. The handles are also adapted to be held releasably in rearward position by bars 46. A cover 48 is detachably secured to the frame over the rotatable cylinder in order that the teeth may be readily reached. A seat 50 for the driver is secured to the rear of the frame and an upwardly extending member 52 prevents the seat from tipping back too far. The bar 54 serves as a cleaner for the teeth in order to prevent the thistles from accumulating thereon. The ends of this bar are attached to arms 56 whose rear ends are pivotally attached to the frame as indicated at 58 in Fig. 2. Stops 60 secured to the frame serve to prevent the cleaner from dropping too far. By referring to Fig. 2, it will be understood that the cleaner bar has an outwardly sliding movement with relation to the teeth 24 in order to strip off thistles after they have been pulled. Hangers 62 depending from the frame have arms 64 pivoted to their inner ends. A bar 66 is secured to the rear ends of the arms 64. The bar 66 is provided with two rows of short downwardly extending teeth, the teeth in the forward row being designated 68 and the teeth in the rear row being designated 70. It will be understood from Fig. 2 that the teeth in the two rows are in staggered relation to each other. These teeth serve as a drag to level the ground in addition to their use as an auxiliary rake. It is obvious that means must be provided for lifting the bar 66 carrying these teeth at rather frequent intervals. For this purpose, a rod 72 is secured at its lower end to the bar 66. This rod extends forwardly in an inclined direction and then vertically, a handle 74 being provided at its upper end. In order to hold the rod 72 downwardly and keep the teeth 68 and 70 in the ground, the rod extends slidably through a member 76 secured to the rear frame member as shown in Fig. 5, the rod having a shoulder 78 adapted to engage underneath the number 76 in which position it is disengageably held by a spring 80. A main rake is mounted at the rear of the machine. This rake includes long teeth 82 secured to a transverse bar 84. Arms 86 are secured at their rear ends to the bar and at their front ends are secured to a transverse rod 88 rotatably mounted in the frame. A lever handle 90 and a foot pedal 92 secured to the rod 88 constitute operating means by which the driver may lift the rake. The rod 88 is also connected with the bar 84 by downwardly inclined arms 94 whereby the rake is firmly supported for swinging movement.

The operation and advantages of my invention will now be understood. When the frame of the machine is lowered on the wheels into the position shown in Fig. 2, it will be apparent that the digging teeth 24 stick into the ground and that as the machine is drawn forwardly the cylinder 18 with the teeth secured thereto will rotate and cause the teeth to have a pulling action on the thistles growing in the ground over which the machine travels. The thistles are caught by the teeth 24 and stripped therefrom by the cleaner 54 so that they drop in front of the rake having the short teeth 68 and 70. This rake is lifted by the driver at frequent intervals by means of the rod 72 and then is quickly dropped so that the teeth level the ground from which the thistles have been pulled. The thistles when released by the front rake will be caught by the rear rake, and when this rake becomes filled, it is lifted by the driver so that the thistles are left in windrows.

I claim:

A machine for pulling and raking thistles comprising a frame, a rotatable member mounted in said frame, a plurality of teeth around said rotatable member for pulling thistles, a rake supported by said frame behind said rotatable member, means for lifting said rake, a second rake supported by said frame behind said first rake, and means for lifting said second rake independently of said first rake.

In testimony whereof I hereunto affix my signature.

GILBERT HALVORSON.